INVENTOR.
LAWRENCE GREBE WILEY
BY Curtis, Morris & Safford

Fig. 2
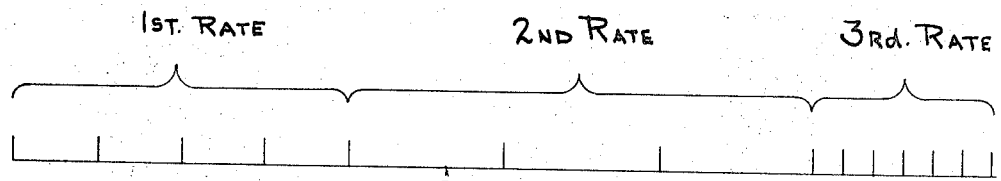
Fig. 2a
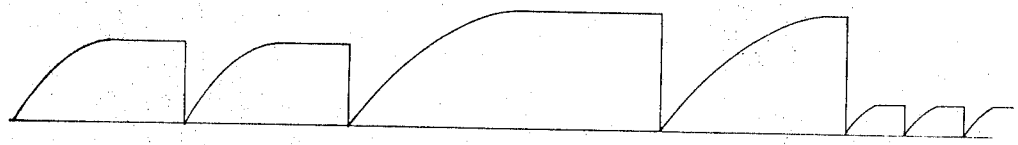
Fig. 2b   CI
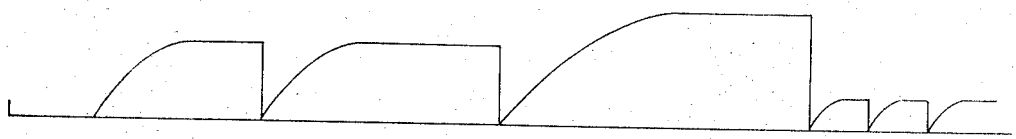
CII   Fig. 2c
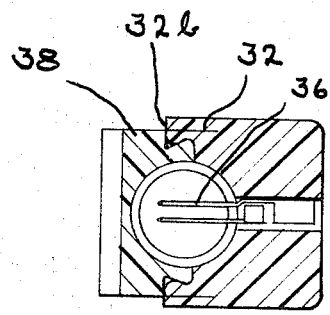
Fig. 4

United States Patent Office 3,553,583
Patented Jan. 5, 1971

3,553,583
CIRCUIT FOR MEASURING THE RATE OF A SERIES OF EVENTS BY EVENT INTERVAL RESPONSE
Lawrence Grebe Wiley, Camp Hill, Pa., assignor to AMP Incorporated, Harrisburg, Pa.
Continuation of application Ser. No. 543,246, Apr. 18, 1966. This application May 29, 1969, Ser. No. 831,264
Int. Cl. G01r 23/02; G04f 9/00
U.S. Cl. 324—189
7 Claims

ABSTRACT OF THE DISCLOSURE

A circuit is disclosed for measuring relatively slow rates of events by measuring the interval between pulses representative of events. A transducer is made to provide a pulse for each event of a series which pulses are utilized to drive a switch which is connected to alternately charge and discharge a pair of capacitors from a voltage supply. The voltage level on a given capacitor is proportional to the interval between pulses and thus events and this level is maintained on a given capacitor to provide a rate output indication while the other capacitor is being charged with switching between capacitors timed by pulses defining the immediately next interval to occur to assure an immediate response. The RC time constant controlling the charging rate of each capacitor is made to be greater than the interval between pulses for the slowest rate of events to be measured by the circuit.

---

This is a continuation of application Ser. No. 543,246, filed Apr. 18, 1966, now abandoned.

BACKGROUND OF THE INVENTION

In the art of measuring rates of events, the usual apparatus consists of some transducer which is responsive to the presence and absence of an event and is capable of providing a signal to some means which is adapted to count the number of events occurring against a given time base. There is also some means provided to convert the number of events per unit of time into some representation which may be read or printed for recordation. The art is an old one and a wide variety of devices have been developed to measure rates of events. These devices include hydraulic, pneumatic, electromechanical and lately, electronic systems, each being used somewhat in accordance with the characteristic frequency range of the events being measured. For extremely high frequencies, rate measurement is most easily accomplished by electronic means although some attempts have been made to measure slower rates by analogous techniques with electronic equipment. As far as is presently known, most of these latter approaches have been relatively expensive in terms of the function provided or have met with other shortcomings including an inability to provide an indication of change of rate instantaneously as such rate change is expressed. Still other shortcomings afflicting the previously mentioned systems as well as the known electronic approaches are lack of portability due to size, weight and power requirements or the characteristics of the input needed and partially becaues of these shortcomings an overall lack of reliability, ease of use and adaptation to use in different environments.

From these comments, it may be surmised that a general object of the invention is to provide an improved rate meter and circuit for measuring and indicating rate of events and reflecting changes therein instantaneously. It is also an object to provide a rate meter and circuit made up of electronic components of a type which are inexpensive, long-lived and require little power in use. It is another object to provide a rate meter and circuit assembly which is small and readily portable and which can be adapted to respond to a wide range of types of events, particularly those having a frequency well under 1000 events per minute. It is yet another object of the invention to provide an electronic circuit which can accurately measure low frequency rates and yet provide an instantaneous indication of changes in rate.

SUMMARY OF THE INVENTION

This invention relates to an electrical rate meter and circuit of the type adapted to provide an instantaneous indication of the frequency of events which occur at relatively slow rates.

The invention overcomes the previously mentioned shortcomings of prior art apparatus and attains the foregoing objectives through the use of a circuit responsive to the input of electrical pulses each associated with the occurrence of an event and operable to measure the interval between such pulses and to produce an output voltage proportional to such voltage as an indication of pulse and event rate. The circuit includes a pair of identical networks and means to alternately drive each network with alternate pulses representative of every other event which occurs. Each network includes a resistance-capacitance path which is selected so that the capacitor thereof cannot be fully charged in the time avaliable between pulses and events for the slowest rate with which the device is to be used. With each network there is provided a switch which is driven to permit the capacitor of one network to charge following one event and pulse and to be read during the interval following the second event and up to the third event and then to be discharged. At the same time the other network includes a switch operable to cause its capacitor to be charged following the second event and to remain charged through the interval between the second and third event up until the occurrence of the fourth event in a series of events. A voltage measuring device is arranged so that it follows one and then the other of the networks and responds to the voltage level of one or the other of the capacitors, which level is a measure of the rate of events occurring. The circuit of the invention includes a number of other details which enable the foregoing operation to be carried out in a reliable manner with fast response to rate change.

In the drawings:

FIGS. 2A–2C are time sequence diagrams showing respectively, a series of three different rates of events and the operation of the capacitors of the circuit related thereto;

FIG. 3 is a diagram showing a general arrangement of a meter and of one embodiment of a transducer useful in a particular embodiment directed to measuring the rate of drop flow which is typically necessary in medical uses such as in intraveneous feeding;

FIG. 4 is a cross-section of the transducer apparatus shown in FIG. 3; and

DESCRIPTION OF PREFERRED EMBODIMENT OF THE INVENTION

Figure 1:
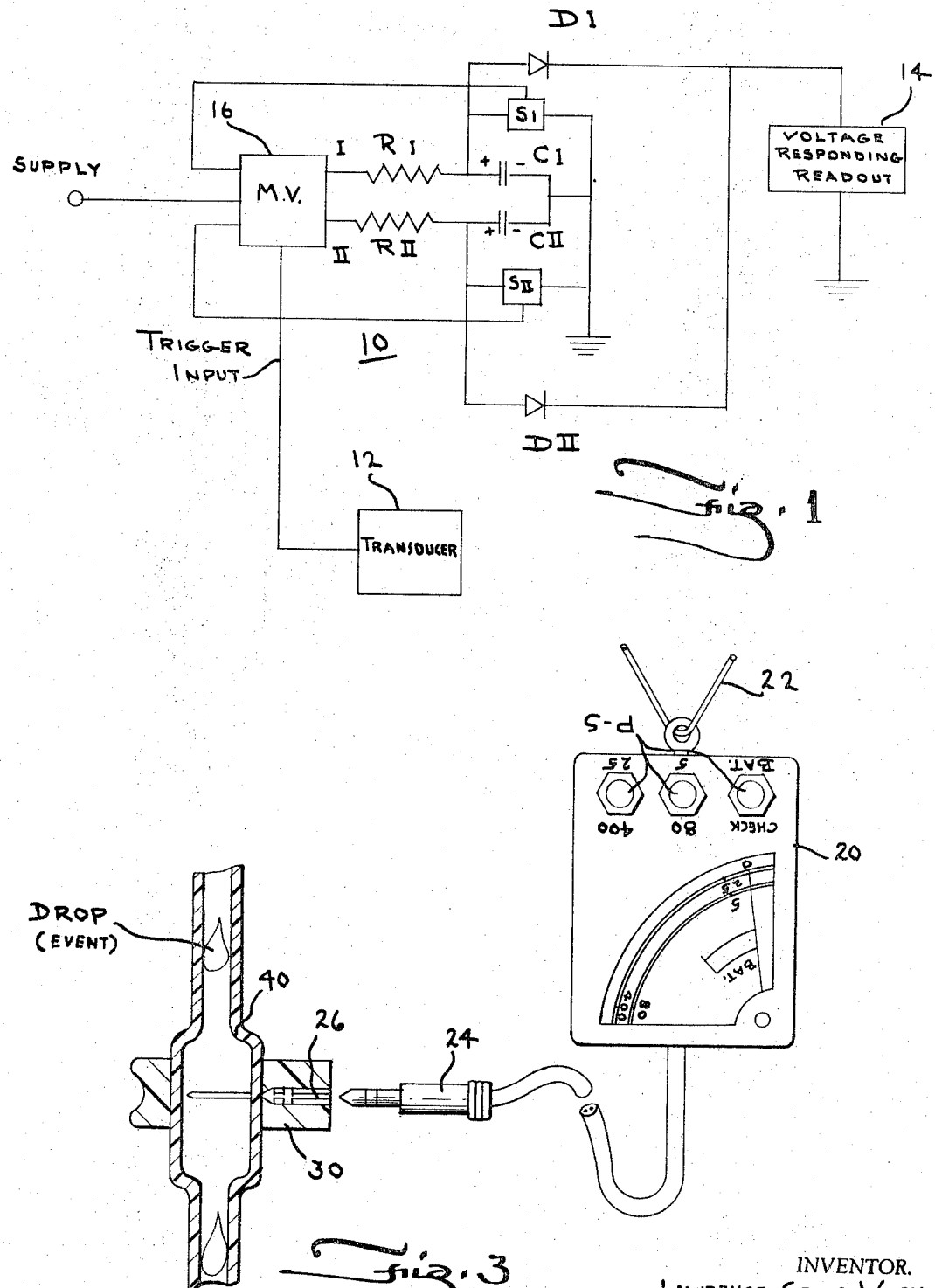
FIG. 1 is a block diagram of the circuit of the invention in a generalized embodiment.

Turning now to FIG. 1, a generalized circuit 10 is shown embodying certain of the principles of the invention. The transducer 12 may be taken as any number of available devices capable of responding to physical changes which represent the occurrence of events and providing an electrical pulse output each time that an event occurs. This output is used as a trigger input to the circuit shown which provides a voltage level output representative of the rate being measured and some voltage responsive read-out device such as 14 is shown for this purpose. The unit 14 may be simply a voltmeter calibrated to track the extent of the range of the rates to be measured or it may be some device adapted to translate the instantaneous voltage level into signals for recordation and/or numerical read-out. The rate measuring circuit itself is shown in FIG. 1 to include a supply which may be taken as a DC source connected to a multivibrator 16 which has its two outputs connected to separate RC network paths. These paths are comprised of resistor RI and capacitor CI and resistor RII and capacitor CII, the two capacitors being tied together on the negative side thereof and grounded. Outputs from the positive side of the capacitors are carried in parallel through separate leads including blocking diodes DI and DII to a common point leading to the voltage responsive read-out device 14. The positive side of each of the capacitors is also connected through a switch such as SI and SII to the ground path. These switches are connected to be driven to briefly close and then open the positive sides of the capacitors to ground by operation of the multivibrator 16.

The multivibrator 16 may be considered as a standard flip-flop, electromechanical or electronic, which is capable of producing an alternate output to the paths I and II responsive to each trigger input.

FIG. 2A shows a series of events of three different rates plotted against a time base. FIGS. 2B and 2C show the voltage charge levels and operation of the circuit with respect to the capacitors CI and CII. Assuming that the circuit is made to be initially at rest with both the capacitors discharged and is then turned on so as to begin to respond to the series of pulses from 12 and assuming that the first pulse causes the multivibrator to switch over to produce an output from path I, the operation of the circuit to measure rate proceeds as follows. When 16 switches over, a pulse is produced which briefly closes and then opens switch SI. This first grounds and then isolates the positive side of CI from ground. At the same time, the multivibrator produces a voltage from the supply which causes CI to charge in the manner shown in FIG. 2B, the rate of charge being determined by the supply voltage and the values of R and C. In accordance with the invention, the RC time constant is made sufficiently large so that C cannot be completely charged in the maximum available time between events or pulses; i.e., a charge rate greater than the interval between the slowest rate of pulses to be measured.

Following the operation in FIG. 2B, it will be seen that CI charges up but that before it becomes fully charged the second pulse input from 12 occurs which drives 16 to cut off its supply to path I and switch over the supply to path II, then charging CII through RII. As this occurs, 16 also drives SI to briefly close and then open and isolate the positive side of CII from the ground path. The switch SI is at this time left open. The path including DI will during the preceding operation experience the voltage level carried on CI which is fed to 14, DII serving to block the level from being diminished by the path then available through SII to ground. If 14 is a voltmeter, its needle will track the increase of voltage on CI until it reaches the state shown in FIG. 2B as relatively constant which occurs as soon as 16 switches the supply from I to II. The voltage to 14 will then remain constant to give a reading of the rate of events accurate to and instantaneous with the occurrence of the second event of a series of events. During the interval between the second event and the third event 14 thus sees the voltage level of CI. At the occurrence of the third event as shown in FIGS. 2A and 2B and C, 16 operates to switch the supply back to path I and in so doing closes the switch SI briefly to discharge CI through the ground path. At this time, however, CII is charged up to a constant level which is supplied through DII to 14. Since this voltage is present at the input to 14, the sudden drop of the voltage level as SI is closed will not be seen by 14. If 14 is a voltmeter, the needle will then remain steady on the level associated with CII. It is for this reason that the resistance and capacitance values of the paths I and II are made identical and supplied by the same supply.

On occurrence of the fourth event SII will be briefly closed to ground to discharge CII. The capacitor CI will have, by this time, charged back up to the level as shown in FIG. 2B and again the level input to 14 will remain constant.

As is shown in FIG. 2A, after the fifth pulse there is a change in rate to an increased interval between events. Circuit 10 tracks this change to respond instantaneously within one interval. As is indicated in FIGS. 2B and 2C, at the occurrence of the fifth event CI is briefly discharged and the device 14 is made to read the level from CII which remains constant throughout the first interval of the second rate. During this time, however, CI is charging and as soon as a portion of the interval equal to the previous rate interval has been reached, the charge of CI will exceed that of CII and carry on up to be representative of the new interval and rate.

The circuit 10 provides an automatic response to an increase in voltage level and charge of CI relative to CII and at the instant referred to the level of 14 will rise. If 14 is a simple voltmeter, the needle will track the charge of CI. The second event or pulse of the second rate will switch 16 to discharge CII and cause it to begin charging again for the interval of the second rate. This discharge of CII will not effect the reading of 14 for the reasons previously mentioned and CII will charge up to the high level related to the increased interval.

FIG. 2A then shows a third rate in the series of events being monitored. As can be discerned, the first pulse of the third rate which is the last pulse of the second rate will discharge CII and cause it to begin charging again, but only for the period of time of the new interval, which is short. The second event or pulse of the third rate will discharge CI and the level input to 14 will drop instantly to that then present on CII. If 14 is a simple voltmeter, this response will be limited only by the inertia of the meter mechanism. For the rates being discussed and even with the most inexpensive voltmeters, the needle will stabilize on the new level almost immediately after the second pulse of the third event. When the next pulse comes along in the series of the third rate the previously mentioned operation will find CI established at the new level associated with the new rate.

The foregoing description, although quite general, should be sufficient for one to comprehend the technique of the invention in detecting, measuring and producing an indication of rates of events. It should also be apparent how the circuit works to provide instantaneous response to changes in rates. FIG. 3 relates to a specific application of the invention and to a specific type of detector or transducer useful with measuring the rate of drop flow which is necessary for medical purposes. This specific example of a use of the invention is included to lend perspective to the description of the circuit of FIG. 5.

Turning briefly to FIG. 3, the circuit of the invention is carried in the housing of the unit 20 which is shown approximately half size. The unit 20 may be suspended by a lanyard 22 carried about the neck of the user in a position so that the face of the instrument may be hand held to be readily observed. Within 20 is a voltmeter movement having a needle and a range or number of ranges for a variety of different rates. On the front of the unit 20 there may be provided a number of push button switches P–S for purposes of test such as checking the voltage supply of the circuit thereof and for different ranges. The source of power for the unit 20 is preferably by small size batteries carried therein and positioned for ease of removal and replacement. The input to 20 is carried through a patch cord 24 which is preferably a shielded twin conductor lead. The patch cord is of a size and type to mate with a jack such as 26 secured to a detector structure shown as 30. The detector structure is as indicated in FIG. 4 comprised of a first member of insulating plastic 32 which carries the jack 26 and two electrodes 36 each connected with or integral with separate portions of the jack 26. With the patch cord plugged into 26, the two electrodes 36 are separately connected back to 20 through the twin lead which is, as mentioned, shielded to prevent radiation from effecting signal level. The interior of 32 is curved to fit over and frictionally engage an enlarged portion of a drop carrying tube 40 in a manner to position the electrodes toward the center of the tube. The outer end portions of 32 include members such as 32B which are designed to mate with fingers of a mating portion 38 and lock the detector assembly to the tube. In use the portion 32 is inserted on the tube with the electrodes being caused to penetrate the tube walls and then the portion 38 is snapped into place to assure that assembly will be secured against accidental displacement. In use the tube is caused to hang vertically at least in the zone including the enlarged portion such that drops passing therethrough fall along an axis to strike the electrodes and alter the impedance existing therebetween. For the DC voltages employed, this impedance will go from some extremely high value (the air path between the electrodes) to some value related to the conductivity of the fluid. In accordance with the invention, the voltage applied to the electrodes 36 is maintained at an exceedingly small value. Even so, with all known fluids injected into the human body the change of impedance represented by a drop passing between the electrodes is quite sufficient to be detected by the preferred circuit of the invention.

Figure 5:
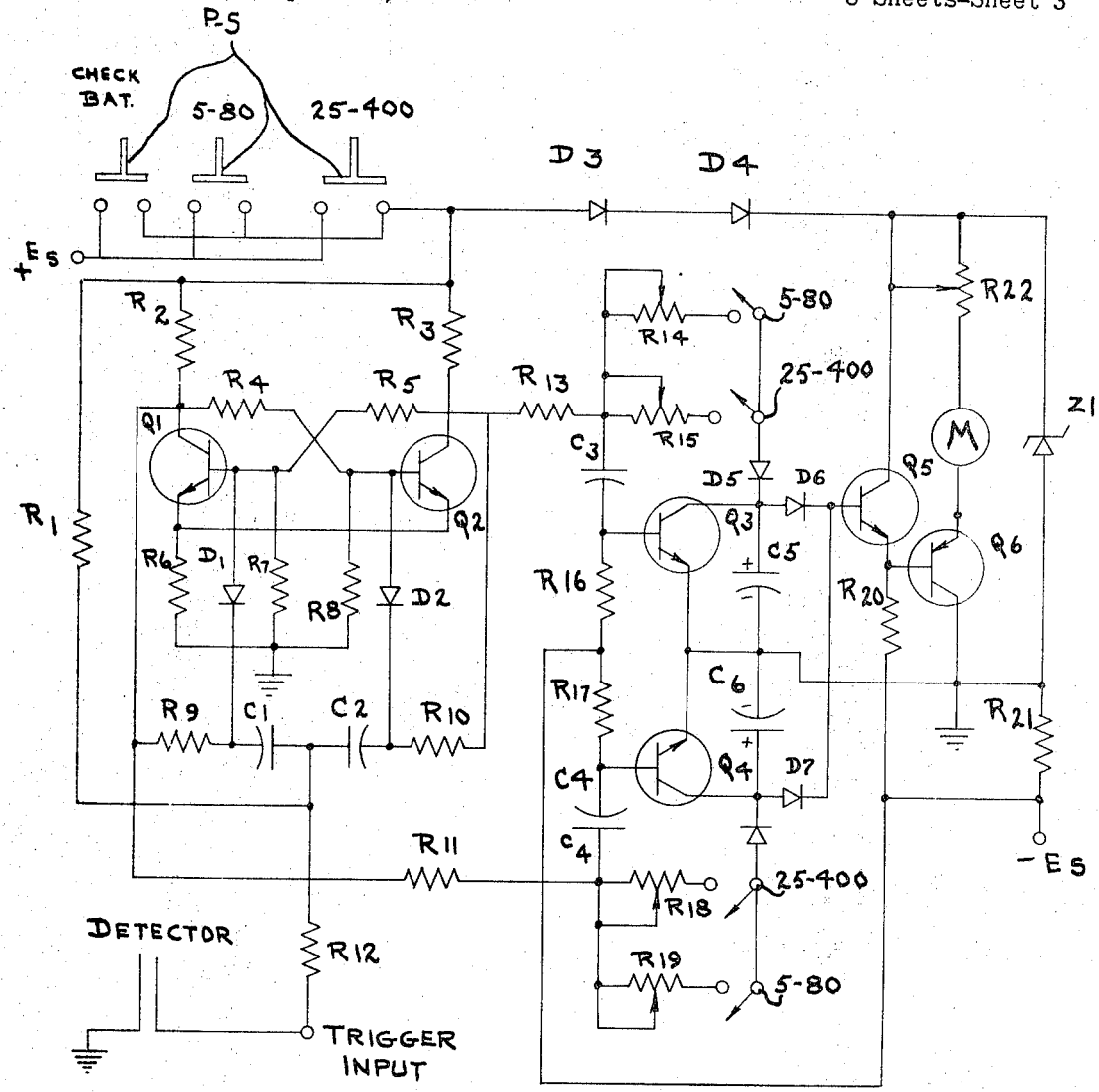
FIG. 5 is a detailed circuit diagram showing components of a preferred embodiment of the circuit of the invention.

This circuit is shown in FIG. 5 and the detector electrodes just mentioned are represented in the lower lefthand portion thereof. With reference to the circuit of FIG. 1, the meter is shown as M and the capacitors discussed are shown as C5 and C6. The multivibrator heretofore described as 16 is shown generally to the left of the circuit. The transistors Q3 and Q4 are the equivalent of the switches SI and SII. In the previously mentioned circuit description relative to FIG. 1 and the operation indicated in FIGS. 2A–2C, it will be apparent that the longer the time interval between events the greater the charge placed upon the capacitors of this circuit. If a simple voltmeter is employed and there is a rate decrease, the voltmeter would tend to show a displacement from what is normally considered zero. To prevent this and to make the circuit respond in a proper characteristic fashion, a portion of the supply voltage is applied across the meter and the voltages developed by the capacitors C5 and C6 are made to subtract from such voltage to provide a comparison of voltages.

The pushbutton switches P–S are connected to energize the circuit only when a reading is to be taken and thus conserve power. When the check-battery button is pushed, the voltmeter will read the supply voltage which will be at or near zero if the voltage is proper (within the scale shown on the meter). The pushbutton switches associated with each range of event rate, 5–80 and 25–400 also close the switches associated with the resistors R14, R15 and R18, R19. When the pushbutton for the range 5–80 is closed, the switches to R14 and R19 are also closed to place these resistors in circuit. When the 25–400 pushbutton is closed, the switches associated with R15 and R18 are closed.

With the circuit energized and no pulses being developed by the detector, either C5 or C6 will be fully chargd depending on which side of the flip-flop is on. If we assume that C5 is fully charged, the circuit will compare the voltage on C5 to the voltage across the Zener diode Z1. The circuit elements in the path across which the supply voltage and the voltage of capacitor C5 are applied are adjusted so that when C5 is fully charged these voltages will be identical. Since the meter is connected to read the difference between the voltage on the capacitors and the supply voltage as applied to the meter, it will then read zero and its needle will be on the left side of the scale. At this time Q1 will be on supplied from positive $E_s$ through the collector load resistor R2, connected through the emitter via resistor R6 to ground.

When the first event occurs, or as in our specific example, the first drop passes to short out the electrodes of the detector, a pulse will be developed through R1 and R12 which operate as a voltage divider relative to $E_s$ to provide a negative step at the junction of capacitors C1 and C2. These capacitors are connected to couple the resulting negative pulse to the bases of Q1 and Q2 which would tend to switch both transistors off. Steering diodes D1 and D2 are provided in the base circuit to steer this negative pulse to the transistor which is then on. The transistor Q1 being then on places D1 at ground and D2 is back biased by the supply voltage which is higher than the negative pulse coupled through capacitors C1 and C2. The transistor Q1 will go off and Q2 will come on to charge the capacitor C3 via resistor R13. The resistor R13 is made sufficiently small to permit C3 to charge rapidly and is made sufficiently large to permit C5 to be charged while C3 is charging. The voltage charging C3 is supplied to the base to emitter junction of Q3 which immediately turns on to discharge C5 through Q3, the collector-emitter circuit thereof, to ground. When C3 is fully charged, there is then no longer a base current drive supplied to Q3 and it turns off. The capacitor C5 starts charging through resistor R3, R13 and R14 or R15 which present a voltage level at the anode side of diode D5. The resistors R14 and R15 are made adjustable to set the RC time constant for the circuit and also to set the time required for the capacitor C5 to become fully charged. The selection of R14 or R15 is made to depend upon the range with which the circuit is to be used. These resistors could be fixed resistors, but the presence of tolerances make it preferable to provide an adjustment so that the RC time constant of the circuit associated with C5 can be made equal to the RC time constant of the circuit associated with C6 for the reasons previously discussed. This adjustment permits an easy compensation for different values of capacitors C5 and C6.

Continuing with the description of the circuit operation, while C5 is charging, C6 is at substantially zero charge. When the second event or second drop occurs to again provide a temporary short across the detector electrodes, Q2 which is then on will be turned off and Q1 will be turned on. The capacitor C5 will then stop charging and maintain its charge for comparison with the voltage applied across the meter by Z1. The circuit seen by the charge on C5 is accordingly made to be of high impedance. When Q1 goes off, C4 starts to charge via R2, R11 and the base to emitter path of Q4 which is turned on to discharge C6 (if any charge is present). When C4 becomes fully charged, Q4 goes off and C6 begins to charge through R2, R11, R18 or R19 and through D8.

When the third pulse comes along Q1 will be turned off and Q2 turned on to charge Q3 and discharge C5 in the manner previously mentioned. The diodes D6 and D7 are inserted in the paths between C5 and C6 and the base of Q5 to permit the meter circuit to respond to the higher of the charges on C5 or C6. This permits an automatic switch-over as one of the capacitors is discharged in the manner mentioned relative to FIG. 1, which prevents M from following the discharge. This causes its needle to remain stationary. The diodes D3 and D4 are provided to balance the supply voltage $E_s$ supplied to Z1 to that supplied by C5 and C6. The resistor R22 permits an adjustment of M to zero for calibration. This adjustment is made with the check-battery pushbutton depressed.

With respect to the circuit of FIG. 5, the following components were employed in an actual unit.

Diodes D1–D8—IN914
Transistors:
   Q1–Q5—2N3904
   Q6—2N3906
Zener diode Z1—IN4735A
R1—22K ohms
R2—1.8K ohms
R4—39K ohms
R6—150 ohms
R7—39K ohms
R8—39K ohms
R9—47K ohms
R11—270 ohms
R12—10K ohms
R13—270 ohms
R14—20K ohms
R15—10K ohms
R16—2.7K ohms
R20—330K ohms
R21—220 ohms
R22—10K ohms
C1—0.1 microfarad
C3—4.7 microfarads
C5—100 microfarads

Having now described by invention in terms intended to enable its preferred practice, I define it through the appended claims.

What is claimed is:

1. In an apparatus for measuring the rate of a series of events, first means to detect the occurrence of each event in the series and to provide a pulse representative thereof, a multivibrator circuit connected to said first means and responsive to each said pulses to alternately provide outputs representative of the occurrence of each event, a pair of identical networks each including a resistor and a capacitor with said networks being connected in parallel to the outputs of said multivibrator and in common to a voltage level responsive circuit capable of providing an indication of pulse rate, each of said networks further including switch means connected to said multivibrator to be driven thereby so as to operate responsive to a series of events and a series of pulses to temporarily close and discharge the capacitor connected thereto and to then open and permit such capacitor to be charged from a common supply as a measure of the time interval between successive pulses, the said capacitors being connected in a circuit including means supplying said voltage level from the capacitor which has the highest voltage charge thereon to said voltage level responsive circuit.

2. The apparatus of claim 1 wherein the RC time constant of each network is made greater than the period of time between pulses at the slowest rate to be measured by said apparatus.

3. The apparatus of claim 2 wherein there is provided a voltage source driving the said means for providing a measure of said voltage level and there is a circuit connected thereto for providing said level as a difference voltage between the charge on a given capacitor and the voltage source.

4. The apparatus of claim 1 wherein the voltage level on each of said capacitors is simultaneously supplied directly to said voltage level responsive circuit.

5. In a circuit for measuring the rates of events in a series of events having different rates, a voltage source, a voltmeter connected to be driven thereby, a pair of capacitors connected to said voltmeter to provide a voltage level subtracting from the level of said source such that said voltmeter reads a voltage inversely proportional to the charge on one or the other of said capacitors, switch means connected to said source and said capacitors to cause said capacitors to be alternately discharged and then charged from said source, means to cause said voltmeter to respond only to the higher charge present on one of said capacitors, and detector means connected in circuit to said switch means and to said source, said detector means being responsive to each event to operate said switch means whereby said capacitors are alternately driven to charge from the same starting point to a level representative of the interval between events and the circuit is made to measure rates of events and changes in rates within one interval of change.

6. The circuit of claim 5 wherein said source is of a relatively low D.C. voltage and said detector means includes a high impedance path to said source such that it operates at a low current.

7. The circuit of claim 5 wherein the charge on each of said capacitors is simultaneously supplied directly to said voltmeter.

References Cited

UNITED STATES PATENTS

| | | | |
|---|---|---|---|
| 2,494,357 | 1/1950 | Rogers | 324—78(E) |
| 2,735,066 | 2/1956 | Corl et al. | 324—78(E) |

FOREIGN PATENTS

| | | | |
|---|---|---|---|
| 575,568 | 2/1946 | Great Britain | 324—68(A) |

ALFRED E. SMITH, Primary Examiner

U.S. Cl. X.R.

324—78